(12) United States Patent
Takagi et al.

(10) Patent No.: US 10,246,152 B2
(45) Date of Patent: Apr. 2, 2019

(54) CONTROL DEVICE FOR MOBILE ROBOT

(71) Applicant: HONDA MOTOR CO., LTD., Tokyo (JP)

(72) Inventors: Yutaka Takagi, Saitama (JP); Chiaki Tanaka, Saitama (JP); Tomoki Watabe, Saitama (JP); Hiroyuki Kaneko, Saitama (JP); Masao Kanazawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 244 days.

(21) Appl. No.: 15/335,600

(22) Filed: Oct. 27, 2016

(65) Prior Publication Data

US 2017/0183047 A1 Jun. 29, 2017

(30) Foreign Application Priority Data

Dec. 25, 2015 (JP) .................. 2015-253178

(51) Int. Cl.
  *G06F 19/00* (2018.01)
  *B62D 57/032* (2006.01)
  *B25J 9/16* (2006.01)
  *B25J 13/08* (2006.01)
(52) U.S. Cl.
  CPC .......... *B62D 57/032* (2013.01); *B25J 9/1664* (2013.01); *B25J 13/085* (2013.01)
(58) Field of Classification Search
  CPC ...... B62D 57/032; B25J 9/1664; B25J 13/085
  USPC ................................ 700/245, 258
  See application file for complete search history.

(56) References Cited

U.S. PATENT DOCUMENTS

| 8,417,382 | B2 * | 4/2013 | Yoshiike | B62D 57/032 |
| | | | | 700/245 |
| 8,442,681 | B2 * | 5/2013 | Orita | B25J 9/163 |
| | | | | 180/8.2 |
| 8,504,208 | B2 * | 8/2013 | Orita | B25J 9/1664 |
| | | | | 700/245 |
| 8,612,053 | B2 * | 12/2013 | Orita | B62D 57/032 |
| | | | | 700/245 |
| 8,825,213 | B2 * | 9/2014 | Kanazawa | B25J 9/1607 |
| | | | | 700/263 |
| 9,802,315 | B2 * | 10/2017 | Kanemoto | B25J 9/1635 |
| 2006/0173578 | A1 * | 8/2006 | Takenaka | B62D 57/032 |
| | | | | 700/245 |

(Continued)

FOREIGN PATENT DOCUMENTS

| JP | 3024028 | 1/2000 |
| JP | 3634238 | 1/2005 |

*Primary Examiner* — Ronnie M Mancho
(74) *Attorney, Agent, or Firm* — Rankin, Hill & Clark LLP

(57) ABSTRACT

A displacement manipulated variable determination section 53 in a control device 40 for a mobile robot 1 determines, for each of contacting portions 13, 23 of a plurality of movable links 3, 4, a displacement manipulated variable for making a desired position and/or posture of the contacting portion 13 or 23 displaced, by integrating, under a predetermined condition, a deviation between an observed value of an actual contact reaction force acting from an external object and a desired value thereof. The control device 40 controls an actuator 41 that drives a corresponding joint, in accordance with the displacement manipulated variable determined and a reference operational goal for the mobile robot 1.

7 Claims, 9 Drawing Sheets

(56) References Cited

U.S. PATENT DOCUMENTS

| | | | | |
|---|---|---|---|---|
| 2008/0208391 A1* | 8/2008 | Hasegawa | ............ | B62D 57/032 |
| | | | | 700/245 |
| 2009/0099689 A1* | 4/2009 | Takenaka | ............. | B62D 57/032 |
| | | | | 700/245 |
| 2009/0312867 A1* | 12/2009 | Hasegawa | ............ | B62D 57/032 |
| | | | | 700/245 |
| 2010/0268382 A1* | 10/2010 | Ohno | .................... | G05D 1/0246 |
| | | | | 700/245 |
| 2011/0264264 A1* | 10/2011 | Shirokura | ............ | B62D 57/032 |
| | | | | 700/245 |
| 2012/0259463 A1* | 10/2012 | Orita | ...................... | B25J 9/1648 |
| | | | | 700/245 |

* cited by examiner

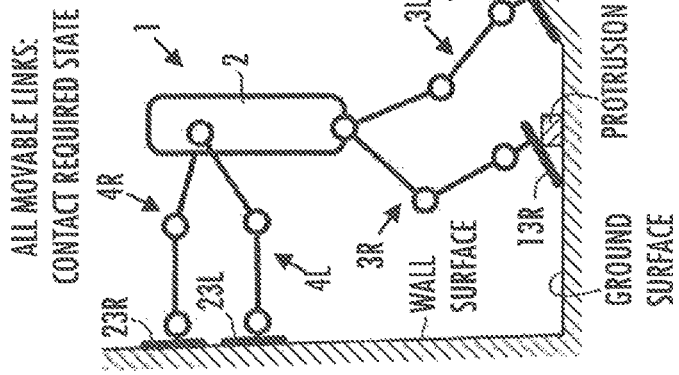
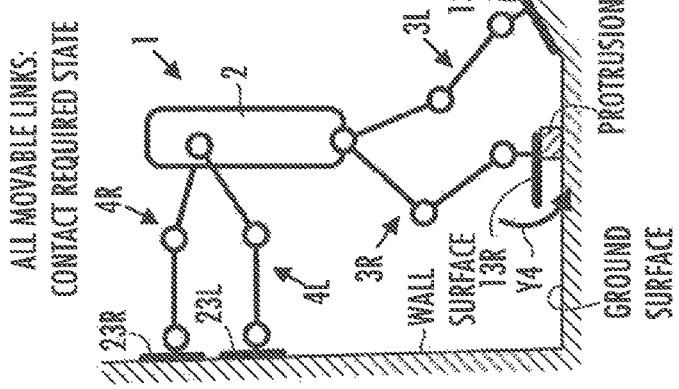
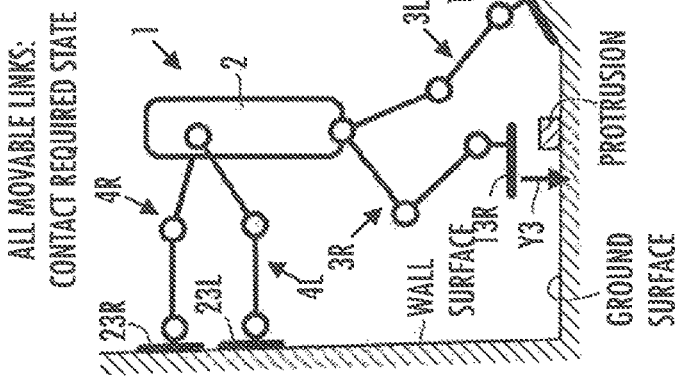

CONTROL DEVICE FOR MOBILE ROBOT

BACKGROUND OF THE INVENTION

1. Field of the Invention

The present invention relates to a control device for a mobile robot which moves with motions of a plurality of movable links extended from its body.

2. Description of the Related Art

Techniques related to a mobile robot having two leg links, for example, for performing operation control of the mobile robot while estimating a floor shape (inclination of the floor) are conventionally known, as seen in, for example, Japanese Patent No. 3024028 (hereinafter, referred to as "Patent Literature 1") or Japanese Patent No. 3634238 (hereinafter, referred to as "Patent Literature 2").

SUMMARY OF THE INVENTION

Recently, for a mobile robot such as a humanoid robot having a plurality of movable links extended from the body, techniques enabling the mobile robot to move, not only on a flat floor surface, but also in various kinds of environments including rough or irregular grounds, have been developed or studied.

In the case of causing a mobile robot to move in various kinds of environments including rough or irregular grounds, the contact surfaces between the respective movable links and an external object such as the ground surface may vary widely in height, degree of inclination, and orientation of each of the contact surfaces.

Particularly, there are many cases where a mobile robot is required to move while making its three or more movable links in contact with a ground surface or other external object as appropriate, depending on the operational environment for the mobile robot. For example, for a humanoid mobile robot to travel on a considerably rough or irregular ground or the like, it is often necessary for the mobile robot to move while making its four movable links, i.e. two leg links and two arm links, brought into contact with external objects as appropriate so as to secure stability in posture of the mobile robot.

In such a situation where three or more movable links are brought into contact with an external object, it is highly likely that the contact surfaces of the respective movable links vary from one another noticeably in either their height, degree of inclination, or orientation.

Thus, in the case of causing a mobile robot to move in various kinds of environments including rough or irregular grounds, it is desirable that the operation control of the mobile robot be performed in such a manner that each movable link may be brought into contact with an external object appropriately, irrespective of the number of movable links to be brought into contact with the external object or the position and posture states of the contact surface of each movable link.

Here, for example the techniques seen in Patent Literature 1 and 2 mentioned above are configured to estimate the inclination of the floor surface on the assumption that the ground-contacting surfaces (contact surfaces) of the respective leg links may be regarded as being on an approximately same plane. Thus, in the case where a mobile robot is made to operate in various kinds of environments including rough or irregular grounds in which the position and posture states of the contact surfaces of the movable links would considerably vary, it would be difficult to apply the techniques seen in Patent Literature 1 and 2 for the purposes of appropriately performing the operation control of the mobile robot.

In view of the foregoing, it is an object of the present invention to provide a control device which enables operation control of a mobile robot so as to allow each movable link to appropriately come into contact with an external object, irrespective of the number of movable links to be brought into contact with an external object or irrespective of the position and posture states of the contact surface of each movable link.

To achieve the above object, a control device for a mobile robot according to the present invention is a control device for a mobile robot having a plurality of movable links extended from a body, each movable link being configured to move with respect to the body by an action of one or more joints disposed between a distal end of the movable link and the body, the mobile robot moving with a motion including an operation in which at least one of the movable links is moved in the air, not in contact with an external object, and a succeeding operation in which a predetermined site as a contacting portion of the movable link is brought into contact with the external object, the control device including:

a contacting portion displacement manipulated variable determination section which, for each of respective contacting portions of the plurality of movable links, sequentially acquires an observed value of a contact reaction force actually acting on the contacting portion from the external object and a desired value of the contact reaction force, and sequentially determines whether it is a situation in which at least one of a first condition that the contacting portion is actually in contact with an external object and a second condition that a desired motional state of the contacting portion indicated by an operational goal for the mobile robot is a state in which the contacting portion is to be brought into contact with the external object, has been satisfied, and performs, for each contacting portion for which the determination result becomes positive, either one integration processing of integrating a first deviation, which is a deviation between the observed value and the desired value of a contact reaction force acting on the contacting portion, or integrating a second deviation, which is a deviation between the first deviation corresponding to each contacting portion and an average value of the first deviations corresponding respectively to all the contacting portions for which the determination result becomes positive, to sequentially determine a first displacement manipulated variable for making a desired position and/or posture of the contacting portion displaced from a position and/or posture indicated by the operational goal for the mobile robot so as to cause the observed value of the contact reaction force acting on the contacting portion to approach the desired value; and an actuator controlling section which sequentially determines a desired displacement amount of each joint of the mobile robot, in accordance with at least the operational goal for the mobile robot and the first displacement manipulated variable determined, to control an actuator that drives the corresponding joint, in accordance with the desired displacement amount (first aspect of the invention).

In the present invention, the "operational goal" for a mobile robot means a goal that defines an overall operation of the mobile robot. The "position and/or posture" of a contacting portion means one or both of "position" and "posture" of the contacting portion. The "desired position and/or posture" means one or both of a desired value of "position" (desired position) and a desired value of "posture" (desired posture).

Further, bringing a contacting portion of a movable link into "contact" with an external object means making the contacting portion come into contact with the external object so that it may receive a contact reaction force therefrom.

The "observed value" of a state quantity, such as a contact reaction force, means a value of the state quantity which is detected by an appropriate sensor, or an estimate which is estimated from a detected value of at least one state quantity having a certain correlation with the state quantity, on the basis of the correlation.

According to the first aspect of the invention, for each contacting portion, the processing of integrating the first or second deviation is carried out in the situation where at least one of the first and second conditions is satisfied, to sequentially determine the first displacement manipulated variable for making the desired position and/or posture of the contacting portion displaced from the position and/or posture indicated by the operational goal for the mobile robot, so as to cause the observed value of the contact reaction force acting on the contacting portion to approach the desired value.

The desired displacement amount of each joint of the mobile robot is sequentially determined in accordance with at least the operational goal for the mobile robot and the first displacement manipulated variable determined. Further, the actuator driving each joint is controlled in accordance with the desired displacement amount.

With this configuration, even in the case where an inclination or a position of a contact surface of each contacting portion with respect to an external object, assumed in the original operational goal for the mobile robot, deviates from the actual inclination or actual position of the contact surface, the influence of such deviation is compensated for each contacting portion. That is, for each contacting portion, in a situation where the contacting portion comes into contact with an external object at a timing or at a position deviated from that of the operational goal, or in a situation where the contacting portion does not come into contact with an external object at a timing at which it should come into contact, the position and/or posture of the contacting portion is adjusted from the position and/or posture indicated by the original operational goal for the mobile robot, such that the contact reaction force of a desired value or close thereto may act on the contacting portion.

Particularly in the case where the contacting portion displacement manipulated variable determination section determines the first displacement manipulated variable by the processing of integrating the second deviation for each contacting portion, in a situation where the mobile robot is standing upright with a plurality of contacting portions in contact with the ground surface, for example, it is possible to prevent the displacement manipulated variable for any one of the plurality of contacting portions from becoming excessively large due to an influence of an offset component or an error in the observed value of the contact reaction force of any of the contacting portions. This also ensures mutual balancing of the displacement manipulated variables of the respective contacting portions.

Therefore, according to the present invention, it is possible to perform the operation control of the mobile robot so that each movable link may come into contact with an external object appropriately, irrespective of the number of the movable links to be brought into contact with an external object, or irrespective of the position and posture states of the contact surface of each movable link.

In the first aspect of the invention, it is preferable that the contacting portion displacement manipulated variable determination section is configured, in the processing of determining the first displacement manipulated variable corresponding to each contacting portion for which the determination result becomes positive and for which the first condition is not satisfied and the second condition is satisfied, to maintain a component of the first displacement manipulated variable that makes the desired posture of the contacting portion displaced, at a constant value, without updating the same, and to sequentially determine a component of the first displacement manipulated variable that makes the desired position of the contacting portion displaced, by the integration processing (second aspect of the invention).

With this configuration, for any contacting portion that should be in contact with an external object in the operational goal for the mobile robot but that is actually not in contact with an external object, the contacting portion is caused to move to approach an external object and then come into contact with the external object, with a change in posture (with respect to the posture indicated by the operational goal) of the contacting portion being restricted.

This allows the contacting portion to smoothly approach the external object, while maintaining a stable posture according to the operational goal.

In the first or second aspect of the invention, it is preferable that the contacting portion displacement manipulated variable determination section is configured, in the processing of determining the first displacement manipulated variable corresponding to any contacting portion for which the determination result becomes positive and for which at least the first condition out of the first and second conditions is satisfied, to sequentially determine both of a component of the first displacement manipulated variable that makes the desired position of the contacting portion displaced and a component of the first displacement manipulated variable that makes the desired posture of the contacting portion displaced, by the integration processing (third aspect of the invention).

With this configuration, for any contacting portion that is actually in contact with an external object, both components constituting the first displacement manipulated variable, i.e. the component making the desired position of the contacting portion displaced and the component making the desired posture of the contacting portion displaced, are sequentially determined by the integration processing. Thus, the adjusting of the position and/or posture of the contacting portion so as to cause the observed value of the contact reaction force acting on the contacting portion to approach the desired value can be made quickly, irrespective of the shape of the external object or the like.

In the first through third aspects of the invention, it is preferable that the contacting portion displacement manipulated variable determination section is configured to determine the first displacement manipulated variable corresponding to each contacting portion that has changed from a situation where the determination result becomes positive to a situation where the determination result becomes negative, in such a manner that the first displacement manipulated variable is sequentially attenuated to zero from the value determined in the situation where the determination result becomes positive (fourth aspect of the invention).

With this configuration, in the situation where a contacting portion is moved away from an external object in accordance with the operational goal, the position and/or posture of the contacting portion can be made to converge to the intended position and/or posture indicated by the operational goal.

In the first through fourth aspects of the invention, it is preferable that the contacting portion displacement manipulated variable determination section further has a function of sequentially determining, irrespective of the determination result, a second displacement manipulated variable and a third displacement manipulated variable as displacement manipulated variables for making the desired position and/or posture of each contacting portion displaced from the position and/or posture indicated by the operational goal for the mobile robot so as to cause the observed value of the contact reaction force acting on each contacting portion to approach the desired value, and a function of sequentially extracting a low-frequency component and a high-frequency component on a higher frequency side than the low-frequency component out of the first deviation or the second deviation, and the contacting portion displacement manipulated variable determination section is configured, in the processing of determining the second and third displacement manipulated variables corresponding to each contacting portion, to sequentially determine a value proportional to the low-frequency component and a value proportional to the high-frequency component as the second displacement manipulated variable and the third displacement manipulated variable, respectively, and in the processing of determining the first displacement manipulated variable corresponding to each contacting portion for which the determination result becomes positive, to sequentially determine the first displacement manipulated variable by integration processing of integrating the low-frequency component, and that the actuator controlling section is configured to sequentially determine the desired displacement amount of each joint of the mobile robot in accordance with the operational goal for the mobile robot and a combined manipulated variable of the first, the second, and the third displacement manipulated variables determined (fifth aspect of the invention).

With this configuration, the combined manipulated variable further includes the second displacement manipulated variable. This makes it possible to cause each contacting portion to more quickly come into contact with an external object in a closely fitting manner.

Further, with the combined manipulated variable further including the third displacement manipulated variable, particularly in the case where a contacting portion comes into contact with an external object in the situation where it should not come into contact therewith, the position and/or posture of the contacting portion can be adjusted more quickly so as to reduce the contact reaction force acting on the contacting portion.

In the first through fifth aspects of the invention, it is preferable that the control device further includes a contact reaction force adjustment quantity determination section which sequentially acquires a body posture deviation, which is a deviation between an observed value of actual posture of the body and a desired posture of the body indicated by the operational goal for the mobile robot, and sequentially determines, in accordance with the body posture deviation, a contact reaction force adjustment quantity to be added to each contacting portion so as to cause an external force making the body posture deviation approach zero to be added to the mobile robot, and that the contacting portion displacement manipulated variable determination section is configured to use, as the desired value of the contact reaction force corresponding to each contacting portion, a value of the contact reaction force obtained by adding the contact reaction force adjustment quantity determined for the contacting portion to a reference contact reaction force, the reference contact reaction force being a contact reaction force that is supposed to dynamically act on each contacting portion assuming that an actual motion of the mobile robot is made in accordance with the operational goal (sixth aspect of the invention).

With this configuration, the desired value of the contact reaction force for each contacting portion includes the contact reaction force adjustment quantity to be added to the contacting portion so as to cause an external force making the body posture deviation approach zero to be added to the mobile robot. Thus, each contacting portion can be brought into contact with an external object such that a contact reaction force appropriate for making the actual posture of the body approach the desired posture will act on the contacting portion.

Accordingly, it is possible to bring each contacting portion into contact with an external object, while securing stability in posture of the body of the robot, irrespective of the shape of the external object or the like.

In the first through sixth aspects of the invention, it is preferable that the control device is configured to have a function of stopping an operation of the mobile robot in a case where at least one of components constituting the first displacement manipulated variable for each of the contacting portions attains an absolute value not smaller than a predetermined threshold value, the components being a component that makes the desired position of the contacting portion displaced and a component that makes the desired posture of the contacting portion displaced (seventh aspect of the invention).

Here, the situation where the absolute value of at least one of the component making the desired position of the contacting portion displaced and the component making the desired posture of the contacting portion displaced becomes not smaller than the predetermined threshold value corresponds to the situation where it is highly likely that the position or shape of the external object is considerably divergent from that assumed in the operational goal.

Thus, according to the seventh aspect of the invention, it is possible to stop the operation of the mobile robot in such a situation, to thereby prevent the posture of the mobile robot from becoming noticeably imbalanced.

BRIEF DESCRIPTION OF THE DRAWINGS

FIGS. 6A, 6B, and 6C illustrate, in order, a second example of operation of the mobile robot;

DESCRIPTION OF THE PREFERRED EMBODIMENTS

First Embodiment

A first embodiment of the present invention will be described below with reference to FIG. 1 to FIG. 8B.

Figure 1:
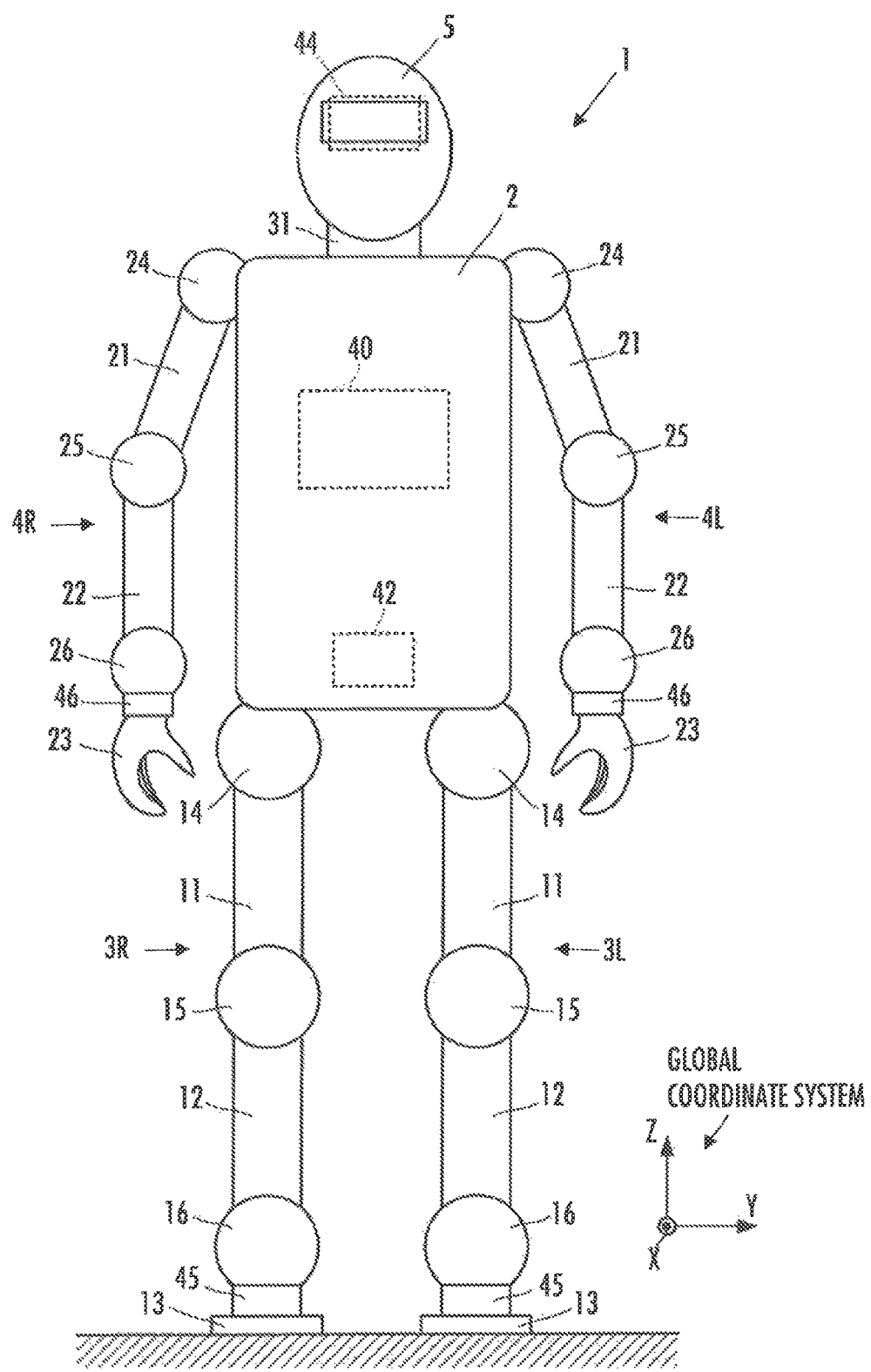
FIG. 1 shows a mobile robot according to an embodiment of the present invention.

Referring to FIG. 1, a mobile robot 1 according to the present embodiment is a humanoid robot, by way of example. The mobile robot 1 (hereinafter, which may be simply referred to as "robot 1") has a body 2, corresponding to an upper body, a pair of right and left (or, two) leg links 3R, 3L and a pair of right and left (or, two) arm links 4R, 4L, as a plurality of movable links extended from the body 2, and a head 5.

In the description of the present embodiment, "R" and "L" added to the reference characters indicate that the elements are on the right side and on the left side, respectively, with respect to the front of the body 2 of the robot 1. The symbol "R" or "L", however, will be omitted when it is unnecessary to distinguish between the right and the left.

Further, in the following description, the leg links 3R, 3L and arm links 4R, 4L may each be simply referred to as a movable link.

Each leg link 3 is extended from the lower portion of the body 2. Each leg link 3 is composed of element links corresponding respectively to a thigh 11, a crus 12, and a foot 13, which are joined via a hip joint 14, a knee joint 15, and an ankle joint 16 in this order from the body 2 side. The foot 13 as a distal portion of each leg link 3 is a site which constitutes a contacting portion that is brought into contact with an external object (ground surface, floor surface, wall surface, etc.) as appropriate during traveling or other occasions of the robot 1.

In the present embodiment, the joints 14, 15, and 16 arranged between the body 2 and the foot 13 of each leg link 3 are configured in such a manner that the foot 13 of the leg link 3 has six degrees of freedom of motion, for example, with respect to the body 2.

For example, the hip joint 14 is configured with three element joints (not shown) so as to have degrees of freedom of rotation about three axes in total. The knee joint 15 is configured with a single element joint (not shown) so as to have a degree of freedom of rotation about a single axis. The ankle joint 16 is configured with two element joints (not shown) so as to have degrees of freedom of rotation about two axes in total. It should be noted that an element joint is a joint having a degree of freedom of rotation about a single axis. The element joint is configured with two members engaged so as to be rotatable relative to each other about an axis.

Each arm link 4 is extended from the upper portion of the body 2. Each arm link 4 is composed of element links corresponding respectively to an upper arm 21, a forearm 22, and a hand 23, which are joined via a shoulder joint 24, an elbow joint 25, and a wrist joint 26 in this order from the body 2 side.

In the present embodiment, each arm link 4 is a movable link which may function as a leg link, besides the leg links 3, 3, which is brought into contact with an external object when necessary. In this case, the hand 23 as a distal portion of each arm link 4 is a site which constitutes a contacting portion that is brought into contact with an external object (ground surface, floor surface, wall surface, etc.) as appropriate in accordance with a mode of operation or the like during traveling of the robot 1.

In the present embodiment, the joints 24, 25, and 26 arranged between the body 2 and the hand 23 of each arm link 4 are configured in such a manner that the hand 23 of each arm link 4 has six degrees of freedom of motion, for example, with respect to the body 2.

For example, the shoulder joint 24 is configured with three element joints (not shown) so as to have degrees of freedom of rotation about three axes in total. The elbow joint 25 is configured with a single element joint (not shown) so as to have a degree of freedom of rotation about a single axis. The wrist joint 26 is configured with two element joints (not shown) so as to have degrees of freedom of rotation about two axes in total.

In the present embodiment, the hand 23 of each arm link 4 is configured so as to be able to grasp an object. For example, each hand 23 is configured with an appropriate grasping mechanism, or with a plurality of finger mechanisms capable of operating in a similar manner as human hand fingers.

The head 5 is attached on top of the body 2 via a neck joint 31. The neck joint 31 is configured so as to have one or more degrees of freedom of rotation about one, two, or three axes.

The above has outlined the mechanical configuration of the robot 1.

The robot 1 configured as described above can move with a motion which includes an operation in which at least one movable link 3 or 4, among four movable links 3, 3, 4, 4, is moved in the air, not in contact with an external object, and a following operation in which the movable link 3 or 4 is brought into contact with the external object.

For example, two leg links 3, 3 may be moved in a motion pattern (of biped gait) similar to the leg motions in a walking operation of a human, to implement a walking operation of the robot 1.

In this case, the robot 1 may travel by moving the leg links 3, 3, while making an arm link 4 brought into contact with a wall, handrail, or the like, as appropriate.

Further, for example, four movable links 3, 3, 4, 4 may be used as legs. The four movable links 3, 3, 4, 4 may be moved in a motion pattern of trot, crawl, or pace (motion pattern of quadruped gait), to enable traveling of the robot 1.

Furthermore, for example, the four movable links 3, 3, 4, 4 may be used to ascend or descend a ladder or the like.

Supplementally, each leg link 3 or each arm link 4 of the robot 1 may be configured to have seven or more degrees of freedom of motion. Further, the joints in each leg link 3 and in each arm link 4 are not limited to the rotary or revolute joints; they may include prismatic joints.

In the case where the robot 1 is one that is not required to grasp an object by a hand 23, each arm link 4 may be constructed such that it has no mechanism for a grasping operation at its distal portion. The robot 1 may have no head 5.

Further, the body 2 may include a joint. For example, the body 2 may be configured with a lower body, to which the leg links 3, 3 are joined, an upper body, to which the arm links 4, 4 are joined, and a joint which joins the upper and lower bodies in a relatively displaceable manner.

A configuration related to the operation control of the robot 1 will now be described. In the following description, the foot 13 of each leg link 3 and the hand 23 of each arm link 4 may be generically referred to as a contacting portion (13 or 23).

Figure 2:
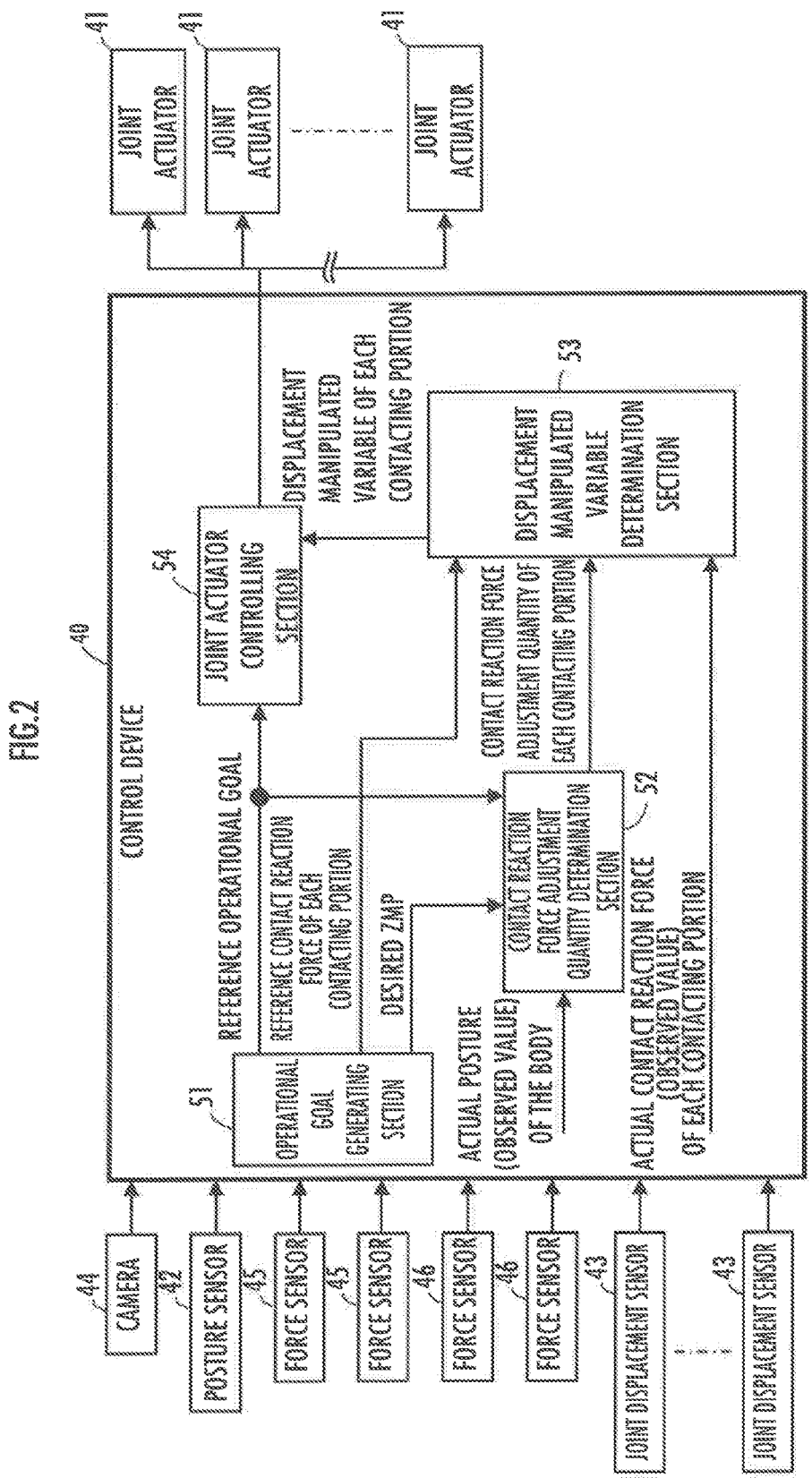
FIG. 2 is a block diagram showing a configuration related to the operation control of the mobile robot according to a first embodiment.
Figure 3:
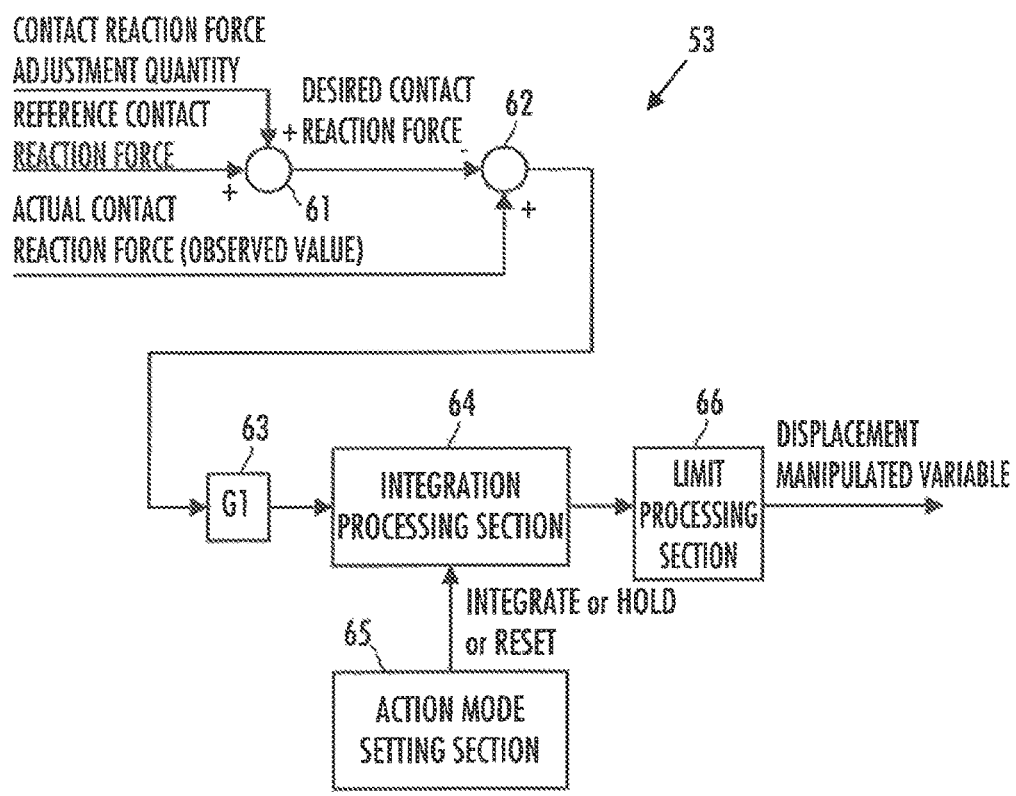
FIG. 3 is a block and line diagram showing the processing performed by the displacement manipulated variable determination section shown in FIG. 2.

As shown in FIG. 2, the robot 1 is provided with a control device 40 which performs operation control of the robot 1, joint actuators 41 for driving corresponding joints (element joints), and various sensors required. Although not shown in the figure, in the present embodiment, the robot 1 is also provided with an actuator for enabling a grasping operation of each hand 23.

The sensors mounted include: a posture sensor 42 for detecting a posture of the body 2 of the robot 1; joint displacement sensors 43 each detecting the amount of displacement (rotational angle) of a corresponding joint (element joint) of the robot 1; a camera 44 as a visual sensor of the robot 1; force sensors 45 each detecting an external force (translational force and moment) that the foot 13 of the corresponding leg link 3 receives from an external object with which the foot 13 is brought into contact; and force sensors 46 each detecting an external force (translational force and moment) that the hand 23 of the corresponding arm link 4 receives from an external object with which the hand 23 is brought into contact.

The posture sensor 42 is a sensor which is mounted on the body 2 so as to be able to detect the posture (spatial orientation) of the body 2 by a strapdown system, for example. The posture sensor 42 is made up of a gyro sensor which detects angular velocities in three axes, and an acceleration sensor which detects translational accelerations in the three axes.

A joint displacement sensor 43 is disposed for each element joint. Each joint displacement sensor 43 is made up of a rotational angle sensor such as a rotary encoder, potentiometer, or the like.

The camera 44 is composed of a stereo camera, for example. The camera 44 is mounted on the head 5, as shown in FIG. 1, for example. In place of, or in addition to, the camera 44, a scanning-type laser ranging sensor or other ranging sensor (for example, laser range finder) may be mounted on the robot 1. The camera 44 may be mounted on the body 2.

A force sensor 45 is disposed for each leg link 3. For example as shown in FIG. 1, each force sensor 45 is made up of a six-axis force sensor which is interposed between the ankle joint 16 and the foot 13 of the corresponding leg link 3.

A force sensor 46 is disposed for each arm link 4. As shown in FIG. 1, each force sensor 46 is made up of a six-axis force sensor which is interposed between the wrist joint 26 and the hand 23 of the corresponding arm link 4.

A joint actuator 41 is disposed for each element joint. Each joint actuator 41 is made up of an electric motor or a hydraulic actuator. Each joint actuator 41 may be a rotary actuator or a linear actuator. It should be noted that the joint actuator 41 corresponds to the actuator in the present invention.

The control device 40 is configured with an electronic circuit unit which includes a CPU, a RAM, a ROM, and an interface circuit. The control device 40 receives detection signals from the sensors described above. The control device 40 may be made up of a plurality of mutually communicable electronic circuit units.

The control device 40 includes, as functions implemented when installed programs are executed, or as functions implemented by hardware configurations: an operational goal generating section 51 which generates an operational goal as a reference (hereinafter, "reference operational goal") that defines an action of each joint of the robot 1; a contact reaction force adjustment quantity determination section 52 which determines a contact reaction force adjustment quantity for adjusting a contact reaction force acting on each contacting portion (13 or 23) from an external object, so as to cause an actual posture of the body 2 to approach a desired posture indicated by the reference operational goal; a displacement manipulated variable determination section 53 which determines a displacement manipulated variable for making each contacting portion (13 or 23) displaced, so as to cause an actual contact reaction force acting on the contacting portion (13 or 23) from an external object to approach a desired contact reaction force (desired value of contact reaction force); and a joint actuator controlling section 54 which controls each joint actuator 41 of the robot 1.

It should be noted that the contact reaction force adjustment quantity determination section 52, the displacement manipulated variable determination section 53, and the joint actuator controlling section 54 are functional units that correspond respectively to the contact reaction force adjustment quantity determination section, the contacting portion displacement manipulated variable determination section, and the actuator controlling section in the present invention. Further, in the present embodiment, the displacement manipulated variable determined by the displacement manipulated variable determination section 53 corresponds to the first displacement manipulated variable in the present invention.

To give supplemental explanation about the terms used herein, the "position/posture" of a given site, such as a contacting portion of the robot 1, means a set of "position" and "posture" of the site. The "desired position/posture" of a given site means a set of a desired value for position (or, desired position) of the site and a desired value for posture (or, desired posture) of the site.

In this case, the "position" of a given site means the spatial position of a representative point of the site that is designed and set as appropriate to the site, and the "posture" of the site means the spatial orientation of the site.

Further, the "position and/or posture" of a given site means one or both of the "position" and the "posture". Similarly, the "desired position and/or posture" of a given site means one or both of the "desired position" and the "desired posture".

The processing performed by the control device 40 will now be described more specifically. In the following description, the leg links 3R, 3L, and the arm links 4R, 4L may be referred to as the first movable link 3R, the second movable link 3L, the third movable link 4R, and the fourth movable link 4L, respectively. Further, a given one of the first through fourth movable links 3R, 3L, 4R, and 4L may be referred to as the i-th movable link, and the contacting portion of the i-th movable link may be referred to as the i-th contacting portion.

The control device 40 sequentially generates a reference operational goal for the robot 1, in the operational goal generating section 51, on the basis of information on an outside world (or, external information) acquired via the camera 44 and the like, and on the basis of an operation command received from an external server or the like, or taught in advance.

The reference operational goal refers to an operational goal as a basic guideline for causing the robot 1 to make a required motion according to the operation command, in an environment recognized from the external information acquired. The operational goal is generated, using an appropriate dynamic model, so as to be able to define the action of each joint of the robot 1 (in other words, an overall motion of the robot 1), while fulfilling the dynamic constraints regarding the zero moment point (ZMP) and the like. The operational goal may be generated in a known manner.

In the present embodiment, the reference operational goal includes a trajectory of desired position/posture as a reference for a respective one of the feet 13 of the leg links 3 and the hands 23 of the arm links 4 (i.e. for each of the contacting portions of the respective movable links 3, 4), a trajectory of desired position/posture as a reference of the body 2, and a trajectory of desired posture as a reference of the head 5. The term "trajectory" means a time series of instantaneous values (for each predetermined control processing cycle).

In this case, in the present embodiment, the desired positions/postures of the respective feet 13, the respective hands 23, and the body 2 are expressed as desired values for position and posture observed in a global coordinate system that is designed and set with respect to the outside world of the robot 1. The desired posture of the head 5 is expressed as a desired value for relative posture of the head 5 observed in a local coordinate system that is designed and set with respect to the body 2.

For the global coordinate system, a three-axis orthogonal coordinate system having an Z axis in a vertical direction and an X axis and a Y axis in two horizontal axes orthogonal to each other, as shown in FIG. 1, for example, may be used. Hereinafter, the X axis, the Y axis, and the Z axis refer to the coordinate axes in the global coordinate system, unless otherwise specified.

The reference operational goal generated by the operational goal generating section 51 further includes a trajectory of a desired ZMP, which is a desired position of the ZMP, and a trajectory of a reference contact reaction force, which is a contact reaction force that acts on each contacting portion (13 or 23) from an external object in the case of causing the robot 1 to operate in accordance with the reference operational goal.

The reference contact reaction force of each contacting portion is determined, using an appropriate dynamic model, such that the resultant force of the reference contact reaction forces of the contacting portions is balanced with the resultant force of the inertial force produced by the motion of the entire robot 1, defined by the reference operational goal, and the gravitational force acting on the robot 1. It should be noted that the reference contact reaction force corresponding to a contacting portion (13 or 23) that is in a non-contact state with respect to an external object in the reference operational goal is zero.

The ZMP is, more specifically, a point at which components in the directions about the horizontal axes (about the X axis and about the Y axis) of a moment produced about that point by the resultant force of the gravitational force acting on the robot 1 and the inertial force produced by the motion of the entire robot 1 become zero.

In the present embodiment, a desired position of the ZMP, or, the desired ZMP, is calculated by the following expressions (1a), (1b), and (1c).

$$Pzmp[Z] = \frac{\sum_{i=1}^{N} Pcop\_i[Z] \cdot F\_i[Z]}{\sum_{i=1}^{N} F\_i[Z]} \qquad (1a)$$

$$Pzmp[X] = \frac{-Ma[Y] - (Pg[Z] - Pzmp[Z]) \cdot Fa[X] + Pg[X] \cdot Fa[Z]}{Fa[Z]} \qquad (1b)$$

$$Pzmp[Y] = \frac{Ma[X] - (Pg[Z] - Pzmp[Z]) \cdot Fa[Y] + Pg[Y] \cdot Fa[Z]}{Fa[Z]} \qquad (1c)$$

Here, Pzmp[Z], Pzmp[X], and Pzmp[Y] represent a position in the Z-axis direction, a position in the X-axis direction, and a position in the Y-axis direction, respectively, of the desired ZMP. N represents a total number of the movable links (in the present embodiment, N=4), Pcop_i[Z] represents a position in the Z-axis direction of a desired position of a contact point at which a contacting portion (foot 13 or hand 23) of the i-th movable link comes into contact with an external object (more specifically, a center of contact pressure on the contact surface between the contacting portion and the external object), and F_i[Z] represents a desired value of a component in the Z-axis direction of a contact reaction force (translational force) that acts on the contacting portion of the i-th movable link from the external object.

Further, Pg[Z]. Pg[X], and Pg[Y] represent a position in the Z-axis direction, a position in the X-axis direction, and a position in the Y-axis direction, respectively, of a desired position of the overall center of gravity of the robot 1. Ma[X] and Ma[Y] represent a component in the direction about the X axis and a component in the direction about the Y axis, respectively, of a moment that is produced about the overall center of gravity of the robot 1 by the resultant force of the gravitational force acting on the robot 1 and the inertial force produced by a desired motion of the entire robot 1 (motion defined by the reference operational goal). Fa[X], Fa[Y], and Fa[Z] represent a component in the X-axis direction, a component in the Y-axis direction, and a component in the Z-axis direction, respectively, of a translational force constituting part of the resultant force.

It should be noted that in the desired motion of the robot 1, in the state where the i-th movable link is not in contact with an external object, F_i[Z] in the above expression (1a) is zero (and, hence, Pcop_i[Z]·F_i[Z]=0). Further, the value obtained by reversing the polarity of Fa[Z] (=−Fa[Z]) equals the value of the denominator of the expression (1a).

With the above expression (1a), the position in the Z-axis direction (in the vertical direction) of the desired ZMP is calculated as a weighted average of the positions in the Z-axis direction of the respective contact points of all the contacting portions (13, 23) to be brought into contact with an external object. In this case, the weighting factor for the position in the Z-axis direction of the contact point of a contacting portion (13 or 23) corresponds to a ratio borne by the component F_i[Z] in the Z-axis direction of the contact reaction force (translational force) caused to act on that contacting portion (13 or 23) (with respect to the component in the Z-axis direction (=the value of the denominator of the expression (1a)) of the total contact reaction force (translational force) acting on the robot 1).

The position in the X-axis direction and the position in the Y-axis direction of the desired ZMP calculated using the expressions (1b) and (1c), respectively, are calculated as a position in the X-axis direction and a position in the Y-axis direction of a point where a moment component in the direction about the X axis and a moment component in the direction about the Y axis produced by the aforesaid resultant force at the position Pzmp[Z] in the Z-axis direction calculated by the expression (1a) both become zero.

The desired ZMP calculated in the above-described manner (desired ZMP defined by the reference operational goal) becomes a point on a planar floor surface in the case where the robot 1 moves on the floor surface. On the other hand, in the case where the contact surfaces of two or more contacting portions (13, 23) of the robot 1 with an external object are not on a single plane, the desired ZMP becomes a point off any planes that respectively include the contact surfaces of the contacting portions (13, 23).

The processing of calculating a desired ZMP as described above is not limited to the case where the robot 1 travels on a floor surface. It also applies to the case where the robot 1 moves while bringing its arm link(s) 4 into contact with a wall or the like, the case where the robot 1 travels on an irregular ground with rubble, or the case where the robot 1 ascends and descends a ladder.

The control device 40 generates a reference operational goal for the robot 1, a desired ZMP, and a reference contact reaction force of each contacting portion (13 or 23), in the operational goal generating section 51 in the above-described manner. It should be noted that the processing in the operational goal generating section 51 may be performed in an external server or the like. In such a case, the control device 40 may acquire, at any time, the reference operational goal, the desired ZMP, and the reference contact reaction force generated in the server or the like, through radio communications or the like.

The control device 40 further carries out the processing in the contact reaction force adjustment quantity determination section 52, the displacement manipulated variable determination section 53, and the joint actuator controlling section 54, sequentially in a prescribed control processing cycle.

The contact reaction force adjustment quantity determination section 52 sequentially acquires a desired posture of the body 2 in the reference operational goal, and an observed value of actual posture of the body 2 estimated in the control device 40 on the basis of an output from the posture sensor 42. The contact reaction force adjustment quantity determination section 52 then calculates an external force moment ↑τ_dmd to be added to the robot 1 so as to cause the actual posture of the body 2 to approach the desired posture, from a deviation between the desired posture and the observed value of the actual posture of the body 2, by a feedback control law such as, for example, a proportional-differential law (PD law).

In the description of the present embodiment, a reference character prefixed with "↑", such as "↑τ_dmd", is a reference character representing a vector (column vector with a plurality of components arranged).

Specifically, a component τ_dmd[X] in the direction about the X axis and a component τ_dmd[Y] in the direction about the Y axis of ↑τ_dmd are calculated by the following expressions (2a) and (2b), respectively, in accordance with the PD law.

$$\tau\_dmd[X] = Kpx \cdot D\theta[X] + Kvx \cdot dD\theta[X] \quad (2a)$$

$$\tau\_dmd[Y] = Kpy \cdot D\theta[Y] + Kvy \cdot dD\theta[Y] \quad (2b)$$

Here, Dθ[X] represents an inclination angle deviation between the desired posture and the observed value of actual posture of the body 2 in the direction about the X axis, dDθ[X] is a temporal change rate (differential value) of the inclination angle deviation Dθ[X], Dθ[Y] represents an inclination angle deviation between the desired posture and the observed value of actual posture of the body 2 in the direction about the Y axis, dDθ[Y] is a temporal change rate (differential value) of the inclination angle deviation Dθ[Y], and Kpx, Kvx, Kpy, and Kvy are gains of predetermined values.

In the present embodiment, a component τ_dmd[Z] in the direction about the Z axis of ↑τ_dmd is set to be constantly zero.

Next, the contact reaction force adjustment quantity determination section 52 calculates a rotation manipulated variable ↑Δθ, which is a rotational amount (rotational angle) by which any contacting portion (13 or 23) to be brought into contact with an external object in the reference operational goal is rotated about the desired ZMP so as to cause ↑τ_dmd to be added to the robot 1. The rotation manipulated variable ↑Δθ is calculated, as expressed by the following expression (3), by multiplying an inverse matrix $A^{-1}$ of a matrix A, defined by the expression (4), by ↑τ_dmd (by linearly converting ↑τ_dmd by the inverse matrix $A^{-1}$).

$$\uparrow\Delta\theta = A^{-1} \cdot \uparrow\tau\_dmd \quad (3)$$

where $$A \equiv \sum_{i=1}^{N} K\_i \cdot (K\tau\_i + (\uparrow rc\_i^T \cdot \uparrow rc\_i \cdot I3 - \uparrow rc\_i \cdot \uparrow rc\_i^T) \cdot Kf\_i) \quad (4)$$

In the above expression (4), N represents a total number of the movable links 3, 4 (in the present embodiment, N=4), I3 is an identity matrix of order 3, and K_i is a variable that is set to "1" in a state (hereinafter, referred to as "contact required state") where it is required that the i-th contacting portion be in contact with an external object in the reference operational goal, and to "0" in a state (hereinafter, referred to as "no-contact required state") where it is required that the i-th contacting portion be not in contact with the external object. In the present embodiment, the value of the variable K_i is set such that, when the i-th contacting portion is switched from one to the other of the contact required state and the no-contact required state, the value changes gradually from one to the other of "1" and "0" at a predetermined temporal change rate (or in a predetermined change pattern over time).

Further, Kτ_i represents the degree of stiffness related to rotational displacement (elastic deformation by the rotational force about the desired ZMP) of the i-th contacting portion, and Kτ_i represents the degree of stiffness related to translational displacement (elastic deformation by the translational force) of the i-th contacting portion. The values of Kτ_i and Kf_i are prescribed values set in advance.

It should be noted that Kτ_i may be a diagonal matrix having, as diagonal elements, set values for the degree of stiffness related to the rotational displacement in the directions about the respective coordinate axes. Similarly, Kf_i may be a diagonal matrix having, as diagonal elements, set values for the degree of stiffness related to the translational displacement in the directions of the respective coordinate axes.

Further, ↑rc_i is a position vector of a contact point (center of contact pressure) of the i-th contacting portion, observed from the desired ZMP. ↑rc_i$^T$ is a transposed vector (row vector) of ↑rc_i.

The position vector ↑rc_i is calculated from the desired ZMP corresponding to the reference operational goal and a desired position of the contact point (center of contact pressure) of the i-th contacting portion which is defined by the desired position/posture of the i-th contacting portion indicated by the reference operational goal.

Next, the contact reaction force adjustment quantity determination section 52 determines a contact reaction force adjustment quantity for each contacting portion (13 or 23). The contact reaction force adjustment quantity is configured with a set of a rotational force component ↑τ_i, made up of a rotational force in the direction about each coordinate axis of the global coordinate system, and a translational force component ↑f_i, made up of a translational force in the direction of each coordinate axis. In this case, for any contacting portion (13 or 23) in the no-contact required state in the reference operational goal, the rotational force component ↑τ_i and the translational force component ↑f_i of the contact reaction force adjustment quantity are both set to a zero vector by the contact reaction force adjustment quantity determination section 52.

Further, for any contacting portion (13 or 23) in the contact required state, the rotational force component ↑τ_i and the translational force component ↑f_i of the contact reaction force adjustment quantity are calculated, using the rotation manipulated variable ↑Δθ calculated by the above expression (3), by the following expressions (5a) and (5b), respectively.

$$↑τ\_i = Kτ\_i \cdot ↑Δθ \quad (5a)$$

$$↑f\_i = Kf\_i \cdot (↑Δθ × ↑rc\_i) \quad (5b)$$

It should be noted that ↑Δθ×↑rc_i on the right side of the expression (5b) is a translational displacement amount when the i-th contacting portion as a contacting portion (13 or 23) in the contact required state is rotated about the desired ZMP by an angle of the rotation manipulated variable ↑Δθ from the desired position/posture indicated by the reference operational goal.

Therefore, in the present embodiment, for any contacting portion (13 or 23) in the contact required state, a rotational force that may be produced elastically in accordance with the rotation displacement amount (=↑Δθ) when the contacting portion (13 or 23) is rotated by the angle of the rotation manipulated variable ↑Δθ from the desired position/posture indicated by the reference operational goal, and a translational force that may be produced elastically in accordance with the translational displacement amount (=↑Δθ×↑rc_i) accompanying that rotation, are determined as the rotational force component ↑τ_i and the translational force component ↑f_i, respectively, of the contact reaction force adjustment quantity for the contacting portion (13 or 23).

In this manner, the contact reaction force adjustment quantity of each contacting portion (13 or 23) is determined such that the moment that is added about the desired ZMP by the resultant force of the contact reaction force adjustment quantities of the contacting portions agrees with the external force moment ↑τ_dmd described above, and such that the displacement in position and posture of any contacting portion (13 or 23) in the contact required state for producing the contact reaction force adjustment quantity of that contacting portion (13 or 23) becomes a displacement that allows the mutual relationships in position and posture of the contacting portions (13, 23) in the contact required state to be maintained at their relationships in position and posture in the reference operational goal.

In the present embodiment, the processing in the contact reaction force adjustment quantity determination section 52 is carried out in the above-described manner. It should be noted that the way of determining the contact reaction force adjustment quantity of each contacting portion (13 or 23) for causing the actual posture of the body 2 to approach the desired posture is not limited to the above-described way. That is, the processing of determining the contact reaction force adjustment quantity of each contacting portion (13 or 23) for causing the actual posture of the body 2 to approach the desired posture such that the moment added about the desired ZMP by their resultant force agrees with the external force moment ↑τ_dmd may be performed in a manner different from that described above.

Next, the control device 40 carries out the processing in the displacement manipulated variable determination section 53 in each control processing cycle. The displacement manipulated variable determination section 53 determines a displacement manipulated variable for each contacting portion (13 or 23) by the processing shown in FIG. 3.

Specifically, the displacement manipulated variable determination section 53 acquires, for each contacting portion (13 or 23), a contact reaction force adjustment quantity, determined by the contact reaction force adjustment quantity determination section 52, a reference contact reaction force, determined by the operational goal generating section 51, and an observed value of actual contact reaction force, indicated by an output from the corresponding force sensor 45 or 46.

The displacement manipulated variable determination section 53 then sums up the contact reaction force adjustment quantity of each contacting portion (13 or 23) and the reference contact reaction force in an arithmetic section 61, to acquire a desired contact reaction force of the contacting portion (13 or 23).

Further, the displacement manipulated variable determination section 53 calculates, in an arithmetic section 62, a deviation (hereinafter, referred to as "contact reaction force deviation") between the observed value of actual contact reaction force and the desired contact reaction force of each contacting portion (13 or 23). It should be noted that the contact reaction force deviation is, more specifically, made up of a deviation (hereinafter, referred to as "translational contact reaction force deviation") related to the translational force of the contact reaction force, and a deviation (hereinafter, referred to as "rotational contact reaction force deviation") related to the rotational force of the contact reaction force. Further, the contact reaction force deviation corresponds to the first deviation in the present invention.

The displacement manipulated variable determination section 53 multiplies the contact reaction force deviation by a gain G1 of a prescribed value in an arithmetic section 63, and inputs the resultant value to an integration processing section 64. The displacement manipulated variable determination section 53 then performs the processing in the integration processing section 64. It should be noted that for the value of the gain G1, a value by which the translational contact reaction force deviation is multiplied and a value by which the rotational contact reaction force deviation is multiplied may be set separately.

The integration processing section 64 has the following three action modes: an integrate mode in which the integration processing section 64 performs processing of integrating an input value (output value from the arithmetic section 63) by a prescribed time constant Ta (integration processing with a transfer function expressed by 1/(Ta·s)); a hold mode in which the integration processing section 64 performs no integration processing on the input value and keeps an output value from the integration processing section 64 constant; and a reset mode in which the integration processing section 64 performs no integration processing on the input value and attenuates an output value from the integration processing section 64 to zero at a prescribed attenuation rate.

The displacement manipulated variable determination section 53 uses an action mode setting section 65 to set an action mode of the integration processing section 64 in accordance with the operational state of the robot 1, and causes the integration processing section 64 to act in that action mode. For the action mode of the integration processing section 64, a translational-force-specific action mode, which is an action mode for the integration processing on the translational contact reaction force deviation of the contact reaction force deviation, and a rotational-forcespecific action mode, which is an action mode for the integration processing on the rotational contact reaction force deviation of the contact reaction force deviation, may be set separately.

Figure 4:
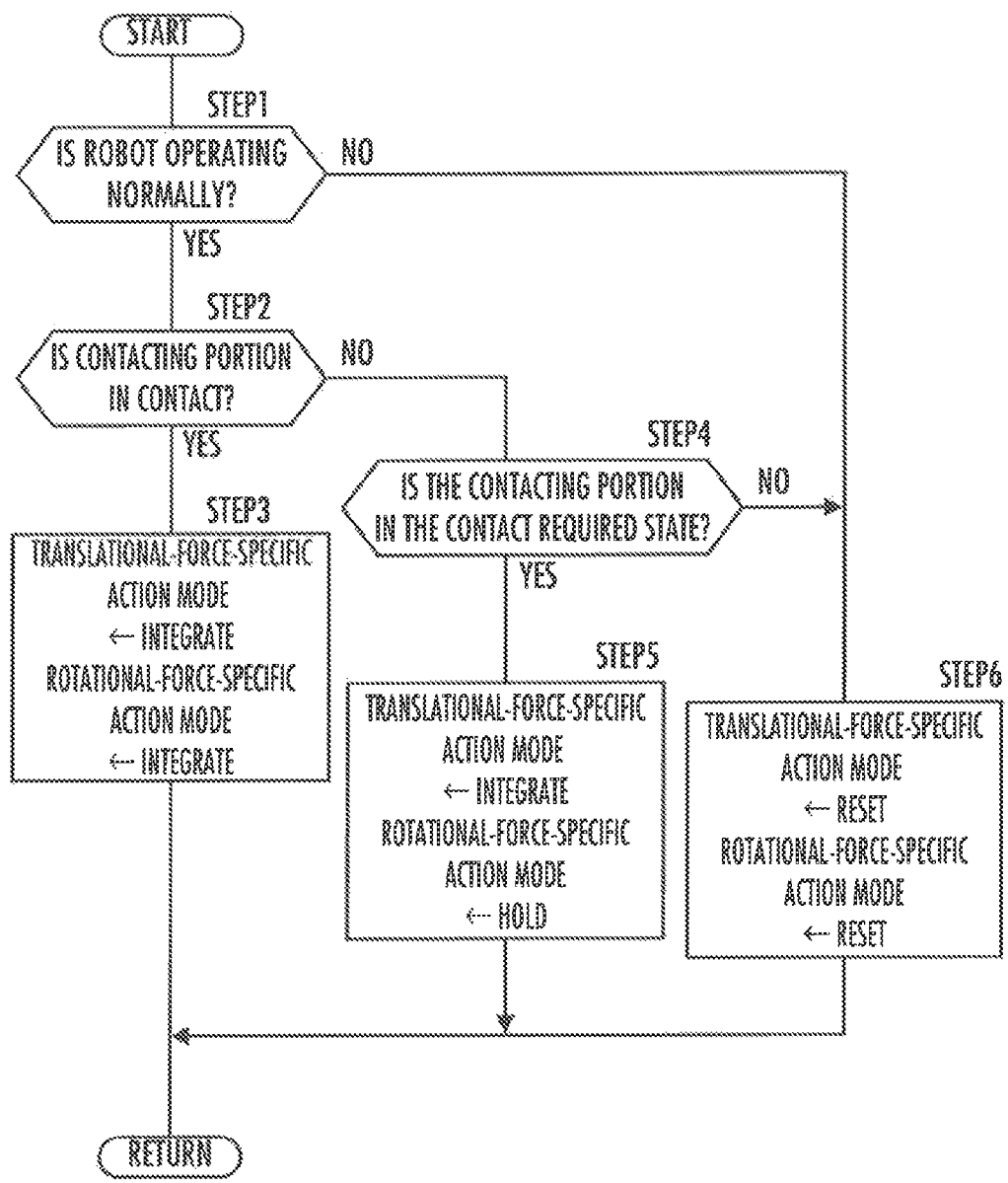
FIG. 4 is a flowchart illustrating the processing performed by the action mode setting section 65 shown in FIG. 3.

The processing of setting an action mode by the action mode setting section 65 is carried out as illustrated in the flowchart in FIG. 4.

In STEP 1, it is determined whether the robot 1 is operating normally. If the determination result is positive, in STEP 2, it is further determined whether a contacting portion (13 or 23) is actually in contact with an external object. It should be noted that the determination processing in STEP 2 corresponds to the processing of determining whether the first condition holds, in the present invention.

The determination in STEP 2 is made, for example, on the basis of an output from the force sensor 45 or 46 corresponding to the contacting portion (13 or 23). Specifically, in the case where an absolute value of the translational force indicated by the output from the force sensor 45 or 46 is not smaller than a predetermined threshold value, it is determined that the contacting portion (13 or 23) is actually in contact with the external object. It should be noted that the determination in STEP 2 may be performed using an appropriate contact detection sensor, instead of the force sensor 45 or 46.

If the determination result in STEP 2 is positive, in STEP 3, the translational-force-specific action mode and the rotational-force-specific action mode are both set to the integrate mode.

If the determination result in STEP 2 is negative, it is further determined in STEP 4 whether a state at the current time of the contacting portion (13 or 23) defined by the reference operational goal is a state required to be in contact with an external object (i.e. the aforesaid contact required state). This determination is made, for example, on the basis of a desired position/posture of the contacting portion indicated by the reference operational goal, or on the basis of the aforesaid reference contact reaction force. Alternatively, the determination in STEP 4 may be made according to whether the value of the coefficient $K\_i$ in the above expression (4) is not smaller than a prescribed value, for example. It should be noted that the determination processing in STEP 4 corresponds to the processing of determining whether the second condition holds, in the present invention.

The situation where the determination result in STEP 4 becomes positive corresponds to the situation where the contacting portion (13 or 23) is actually away from an external object although the contacting portion (13 or 23) is supposed to be in contact with the external object.

In this situation, in STEP 5, the translational-force-specific action mode is set to the integrate mode, and the rotational-force-specific action mode is set to the hold mode.

If the determination result in STEP 1 is negative (when the robot 1 is not operating normally), or if the determination result in STEP 4 is negative (when the contacting portion (13 or 23) is in the aforesaid no-contact required state and actually not in contact with the external object), then, in STEP 6, the translational-force-specific action mode and the rotational-force-specific action mode are both set to the reset mode.

The integration processing section 64 then carries out the processing in the action mode set in the action mode setting section 65 in the above-described manner.

Specifically, in the situation where the translational-force-specific action mode and the rotational-force-specific action mode are both set to the integrate mode in STEP 3 above (in other words, in the situation where the contacting portion (13 or 23) is actually in contact with the external object), the integration processing section 64 sequentially integrates both of the input value corresponding to the translational contact reaction force deviation and the input value corresponding to the rotational contact reaction force deviation by the prescribed time constant Ta, and outputs the obtained integral values.

In this case, the integral value calculated in the integration processing section 64 by the integration processing in accordance with the translational contact reaction force deviation is a feedback manipulated variable for making the contacting portion (13 or 23) translationally displaced so as to cause the translational contact reaction force deviation to approach zero. Further, the integral value calculated in the integration processing section 64 by the integration processing in accordance with the rotational contact reaction force deviation is a feedback manipulated variable for making the contacting portion (13 or 23) rotationally displaced so as to cause the rotational contact reaction force deviation to approach zero.

Further, in the situation where the translational-force-specific action mode is set to the integrate mode and the rotational-force-specific action mode is set to the hold mode in STEP 5 above (in other words, in the situation where the contacting portion (13 or 23) is actually away from an external object although the contacting portion (13 or 23) should be in contact with the external object), the integration processing section 64 sequentially integrates the input value corresponding to the translational contact reaction force deviation by the prescribed time constant Ta. This integration processing calculates a feedback manipulated variable by which the contacting portion (13 or 23) is translationally displaced such that the translational contact reaction force deviation approaches zero.

On the other hand, the integration processing section 64 performs no integration processing on the input value corresponding to the rotational contact reaction force deviation; the output value from the integration processing section 64 corresponding to the rotational contact reaction force deviation is maintained at the value in the last time's control processing cycle. Thus, during the period in which the action mode is set in the hold mode, the output value from the integration processing section 64 corresponding to the rotational contact reaction force deviation is held at the value immediately before the initiation of the hold mode period.

Further, in the situation where the translational-force-specific action mode and the rotational-force-specific action mode are both set to the reset mode in STEP 6 above (in other words, in the situation where the contacting portion (13 or 23) is in the aforesaid no-contact required state and it is actually not in contact with the external object), the integration processing section 64 performs no integration processing on the input values. The integration processing section 64 determines the output value corresponding to the translational contact reaction force deviation and the output value corresponding to the rotational contact reaction force deviation in such a manner that they are both sequentially attenuated to zero at a prescribed attenuation rate. In this case, the attenuation rate of the output values of the integration processing section 64 is set, in accordance with the reference operational goal, such that the output values may be attenuated to zero before a desired timing (in the reference operational goal) at which the contacting portion (13 or 23) will come into contact with an external object next time.

The displacement manipulated variable determination section 53 carries out the processing in the integration processing section 64 in the above-described manner, and then performs limit processing on the output values from the integration processing section 64 in a limit processing section 66. The displacement manipulated variable determination section 53 determines the resultant values as the displacement manipulated variables.

Here, in the case where the output values from the integration processing section 64 (the output value corresponding to the translational contact reaction force deviation and the output value corresponding to the rotational contact reaction force deviation) are both within a prescribed allowable range determined in advance, the limit processing section 66 determines the output values from the integration processing section 64, as they are, as the displacement manipulated variables.

In the case where the output value corresponding to the translational contact reaction force deviation or the output value corresponding to the rotational contact reaction force deviation falls outside the prescribed allowable range, the limit processing section 66 forcibly restricts the output value to the limit of the allowable range, and determines the resultant value as the displacement manipulated variable.

The processing in the displacement manipulated variable determination section 53 is carried out as described above for each contacting portion (13 or 23). As a result, for each contacting portion (13 or 23), the displacement manipulated variable according to the translational contact reaction force deviation and the displacement manipulated variable according to the rotational contact reaction force deviation are determined sequentially in a prescribed control processing cycle.

In this case, the displacement manipulated variable according to the translational contact reaction force deviation is a manipulated variable for making the contacting portion (13 or 23) translationally displaced such that the translational contact reaction force deviation approaches zero (i.e. manipulated variable for changing the desired position of the contacting portion (13 or 23) from the position indicated by the reference operational goal). Further, the displacement manipulated variable according to the rotational contact reaction force deviation is a manipulated variable for making the contacting portion (13 or 23) rotationally displaced such that the rotational contact reaction force deviation approaches zero (i.e. manipulated variable for changing the desired posture of the contacting portion (13 or 23) from the posture indicated by the reference operational goal).

In each control processing cycle, the control device 40 next carries out the processing in the joint actuator controlling section 54. The joint actuator controlling section 54 sequentially determines a desired displacement amount (desired value of rotational angle) of each joint (element joint) of the robot 1, in accordance with the reference operational goal and the displacement manipulated variable for each contacting portion (13 or 23).

In this case, the joint actuator controlling section 54 corrects the desired position/posture of each contacting portion (13 or 23) included in the reference operational goal. Specifically, the joint actuator controlling section 54 corrects the desired position by the displacement manipulated variable according to the translational contact reaction force deviation, and corrects the desired posture by the displacement manipulated variable according to the rotational contact reaction force deviation.

The joint actuator controlling section 54 then determines a desired displacement amount of each joint (element joint) of the robot 1, by arithmetic processing of inverse kinematics of the robot 1, from the desired position/posture, after correction, of each contacting portion (13 or 23), as well as the desired position/posture of the body 2 and the desired posture of the head 5 indicated by the reference operational goal.

The joint actuator controlling section 54 further performs feedback control of the joint actuators 41 so as to cause the actual displacement amount of each joint (value detected by the corresponding joint displacement sensor 43) to agree with the desired displacement amount. This enables the robot 1 to operate in accordance with the corrected operational goal.

In a situation where an absolute value of the integral value obtained by the integration processing section 64 for any contacting portion (13 or 23) (specifically, the absolute value of the integral value according to the translational contact reaction force deviation, or the absolute value of the integral value according to the rotational contact reaction force deviation) becomes excessively large, it is highly likely that the shape of the external object with which the contacting portion (13 or 23) is to be brought into contact has collapsed noticeably from the shape assumed in the reference operational goal.

Thus, in the present embodiment, the control device 40 carries out emergency stop processing of the robot 1 in the case where the absolute value of the integral value of the integration processing section 64 concerning any contacting portion (13 or 23) becomes not smaller than the prescribed threshold value. In this emergency stop processing, the control device 40 stops the operation of the robot 1 after, for example, making any contacting portion (13 or 23) that has been moved in the air return to the location where it was in contact with the external object before initiation of the movement in the air.

The above has described in detail the operation control of the robot 1 according to the control processing by the control device 40. The actions of the robot 1 according to such operation control and their advantages will now be described with reference to FIGS. 5A to 8B.

Figure 5A:
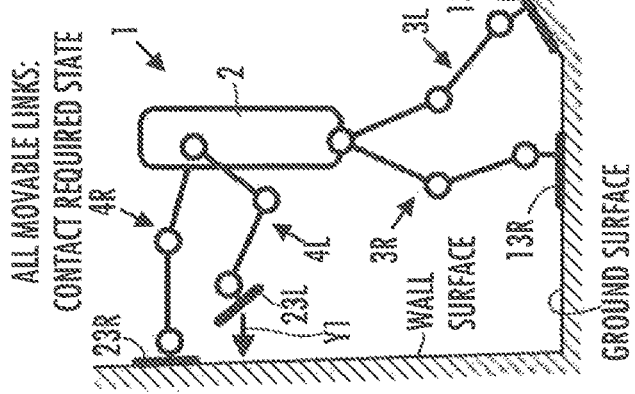
FIGS. 5A, 5B, and 5C illustrate, in order, a first example of operation of the mobile robot.
Figure 5B:
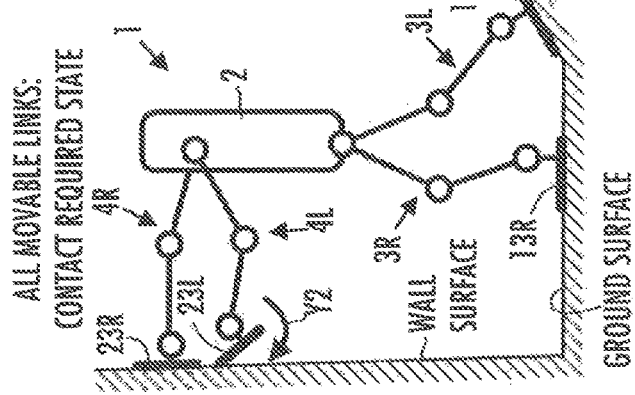
Figure 5C:
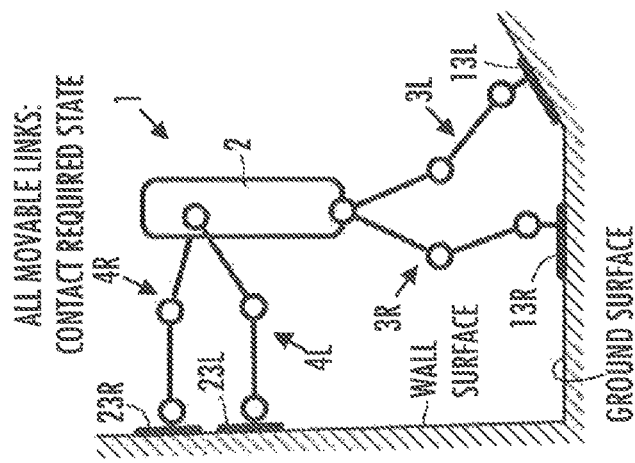

FIGS. 5A, 5B, and 5C illustrate, in order, the operations of the robot 1 in the case where one contacting portion, for example the hand 23L, of the robot 1 is actually not in contact with an external object in the state where all the contacting portions 13R, 13L. 23R, and 23L (feet 13R, 13L and hands 23R 23L) of the first to fourth movable links 3R. 3L, 4R, and 4L are in the contact required state.

It should be noted that the robot 1 is schematically illustrated in FIGS. 5A, 5B, and 5C, with its head 5 not illustrated. Further, in the example illustrated in FIGS. 5A, 5B, and 5C, the external object with which the feet 13R and 13L are brought into contact is a ground surface, and the external object with which the hands 23R and 23L are brought into contact is a wall surface. The same applies to FIGS. 6A to 6C, and to FIGS. 7A and 7B.

In the situation illustrated in FIG. 5A, the action mode of the integration processing section 64 corresponding to the hand 23L, not in contact with the wall surface, is set in STEP 5 described above. Thus, the robot 1 moves the hand 23L, as indicated by the arrow Y1, so as to cause the hand 23L to approach the wall surface with which it should be in contact (and, hence, to cause the translational contact reaction force deviation corresponding to the hand 23L to approach zero), while maintaining the posture of the hand 23L at its posture in the reference operational goal.

Here, it is assumed that the output values of the integration processing section 64 corresponding to the hand 23L have been attenuated to zero before the time point corresponding to FIG. 5A.

Next, as illustrated in FIG. 5B, the hand 23L comes into contact with the wall surface, causing a contact reaction force to act on the hand 23L. In this situation, the action mode of the integration processing section 64 corresponding to the hand 23L is set in STEP 3 described above. Thus, as shown in FIG. 5B, the hand 23L is pressed against the wall surface such that the translational force (observed value) as part of the contact reaction force acting on the hand 23L approaches a translational force as part of the desired contact reaction force, and, at the same time, the posture of the hand 23L is rotated, as indicated by the arrow Y2, such that the rotational force (observed value) as part of the contact reaction force acting on the hand 23L approaches a rotational force as part of the desired contact reaction force.

As a result, as illustrated in FIG. 5C, the hand 23L finally comes into contact with, and fits closely to, the wall surface.

Next, FIGS. 6A, 6B, and 6C illustrate, in order, the operations of the robot 1 in the case where one contacting portion, for example the foot 13R, of the robot 1 is actually not in contact with an external object in the state where all the contacting portions 13R, 13L, 23R, and 23L (feet 13R. 13L and hands 23R, 23L) of the first to fourth movable links 3R, 3L, 4R, and 4L are in the contact required state.

It is assumed in FIGS. 6A, 6B, and 6C that there is a protrusion between the foot 13R and the ground surface with which the foot 13R is to be brought into contact.

In the situation illustrated in FIG. 6A, the action mode of the integration processing section 64 corresponding to the foot 13R, not in contact with the ground surface, is set in STEP 5 described above. Thus, the robot 1 moves the foot 13R, as indicated by the arrow Y3, so as to cause the foot 13R to approach the ground surface with which it should be in contact (and, hence, to cause the translational contact reaction force deviation corresponding to the foot 13R to approach zero), while maintaining the posture of the foot 13R at its posture in the reference operational goal.

Here, it is assumed that the output values of the integration processing section 64 corresponding to the foot 13R have been attenuated to zero before the time point corresponding to FIG. 6A.

Next, when the foot 13R comes into contact with the protrusion, causing a contact reaction force to act on the foot 13R (situation illustrated in FIG. 6B), the action mode of the integration processing section 64 corresponding to the foot 13R is set in STEP 3 described above. Thus, as shown in FIG. 6B, the foot 13R is pressed against the protrusion such that the translational force (observed value) as part of the contact reaction force acting on the foot 13R approaches a translational force as part of the desired contact reaction force, and, at the same time, the posture of the foot 13R is rotated, as indicated by the arrow Y4, such that the rotational force (observed value) as part of the contact reaction force acting on the foot 13R approaches a rotational force as part of the desired contact reaction force.

As a result, as illustrated in FIG. 6C, the foot 13R finally comes into contact with, and fits closely to, the ground surface and the protrusion.

Figure 7A:
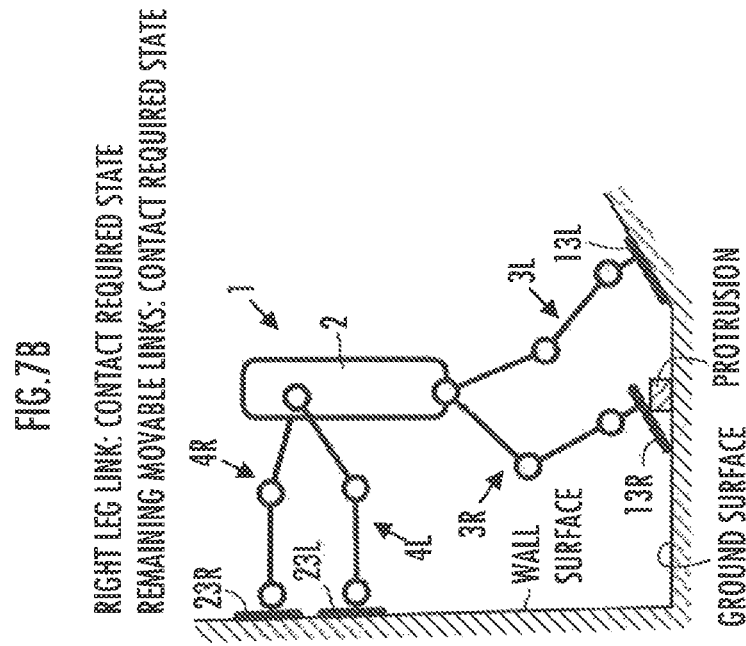
FIGS. 7A and 7B illustrate, in order, a third example of operation of the mobile robot.
Figure 7B:
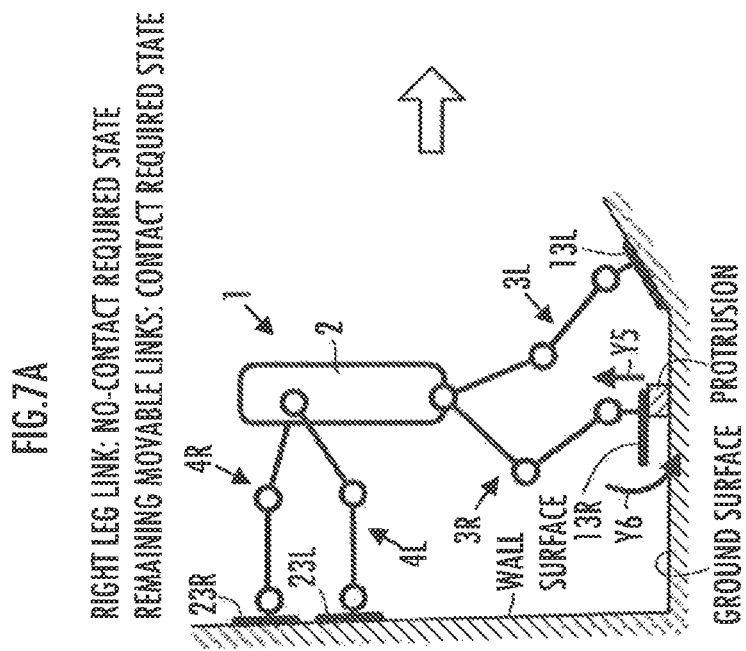

Next, FIGS. 7A and 7B illustrate, in order, the operations of the robot 1 in the case where the foot 13R of the right leg link 3R, i.e. the first movable link, comes into contact with a protrusion on the ground surface in the no-contact required state immediately before it attains the contact required state, while the contacting portions 13L, 23R, and 23L (foot 13L and hands 23R, 23L) of the second to fourth movable links 3L, 4R, and 4L, among the first to fourth movable links 3R. 3L, 4R, and 4L are in the contact required state, and thereafter, all the contacting portions 13R, 13L, 23R, and 23L attain the contact required state.

In the situation illustrated in FIG. 7A, the action mode of the integration processing section 64 corresponding to the foot 13R, which has come into contact with the protrusion on the ground surface in the no-contact required state, is set in STEP 3 described above. Thus, as indicated by the arrows Y5 and Y6, the robot 1 moves the foot 13R such that the foot 13R is lifted up from the protrusion and rotated at the same time (and, hence, such that the translational contact reaction force deviation and the rotational contact reaction force deviation corresponding to the foot 13R both approach zero). With this, the position/posture of the foot 13R is adjusted such that the contact reaction force acting on the foot 13R in the no-contact required state approaches zero.

When all the contacting portions 13R, 13L, 23R, and 23L finally attain the contact required state, the foot 13R comes into contact with, and fits closely to, the ground surface and the protrusion, as shown in FIG. 7B (as in the case of FIG. 6C).

Figure 8A:
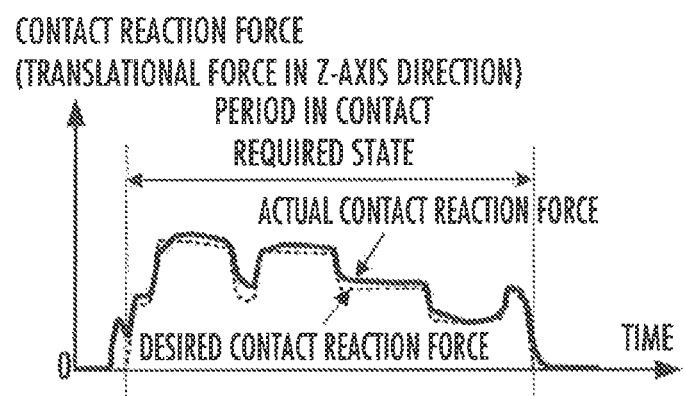
FIGS. 8A and 8B are graphs showing, by way of example, changes over time of a contact reaction force acting on a contacting portion and a displacement manipulated variable of the contacting portion, respectively.
Figure 8B:
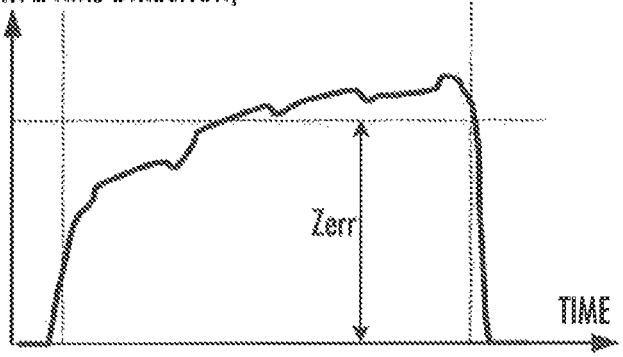

FIGS. 8A and 8B are graphs showing, by way of example, changes over time of a translational force in the Z-axis direction as part of the contact reaction force acting on one foot, for example the foot 13L, and a translational displacement component in the Z-axis direction as part of the displacement manipulated variable in the case where, while the robot 1 is traveling in biped gait, the foot 13L has happened to come into contact with the ground surface in the no-contact required state immediately preceding the contact required state.

As shown in FIG. 8A, the position/posture of the foot 13L is adjusted such that the actual contact reaction force (here, actual translational force in the Z-axis direction) acting on the foot 13L tracks the desired contact reaction force. In this case, as illustrated in FIG. 8B, the translational displacement component in the Z-axis direction as part of the displacement manipulated variable corresponding to the foot 13L is calculated such that it takes a value close to a deviation Zerr between the actual position in the Z-axis direction of the ground surface with which the foot 13L comes into contact and its position in the Z-axis direction assumed in the reference operational goal, in the period during which the foot 13L is in the contact required state.

As described above, according to the present embodiment, for each contacting portion (13 or 23), the displacement manipulated variable for making the desired position/posture of the contacting portion (13 or 23) displaced from the position/posture in the reference operational goal such that the observed value of the actual contact reaction force approaches the desired contact reaction force is determined. The joint actuators 41 of the robot 1 are then controlled so as to implement the desired position/posture of each contacting portion (13 or 23) obtained by correcting its position/posture in the reference operational goal by the displacement manipulated variable corresponding to the contacting portion.

It is therefore possible to cause each contacting portion (13 or 23) of the robot 1 to come into contact with an external object so as to be able to receive a desired contact reaction force or a contact reaction force close thereto, irrespective of the shape of the external object with which the contacting portion (13 or 23) is brought into contact, or the like.

In this case, the desired contact reaction force is adjusted such that the actual posture of the body 2 may approach the desired posture. It is thus possible to cause each contacting portion (13 or 23) to come into contact with an external object, while keeping the body 2 in a stable posture, irrespective of the shape of the external object or other factor.

In the case where a contacting portion (13 or 23), in the no-contact required state, comes into contact with an external object, the displacement manipulated variable is determined by integration processing, in accordance with both the translational contact reaction force deviation and the rotational contact reaction force deviation. This enables the position/posture of the contacting portion (13 or 23) to be adjusted to conform to the shape of the external object, in the no-contact required state immediately preceding the contact required state. Thus, when the contacting portion (13 or 23) is switched from the no-contact required state to the contact required state, the contacting portion (13 or 23) can quickly be brought into contact with the external object, in a closely fitting manner, so as to be able to receive the desired contact reaction force or a contact reaction force close thereto.

Further, in the case where a contacting portion (13 or 23), in the contact required state, is not in contact with an external object, the displacement manipulated variable is determined by integration processing, in accordance with the translational contact reaction force deviation out of the translational and rotational contact reaction force deviations. The output value of the integration processing section 64 corresponding to the rotational contact reaction force deviation is held constant.

This can cause the contacting portion (13 or 23) to smoothly approach and then come into contact with the external object, while preventing a change in posture of the contacting portion (13 or 23).

In the state where a contacting portion (13 or 23) is in contact with an external object, the displacement manipulated variable is determined by integration processing, in accordance with both the translational contact reaction force deviation and the rotational contact reaction force deviation. It is thus possible to adjust the position/posture of the contacting portion (13 or 23) so as to cause the actual contact reaction force to quickly approach the desired contact reaction force.

Second Embodiment

A second embodiment of the present invention will now be described with reference to FIG. 9. The present embodiment differs from the first embodiment only in part of the processing in the control device 40. Thus, in the present embodiment, the matters different from the first embodiment will be described primarily, and the description of the matters identical to the first embodiment will be omitted.

Figure 9:
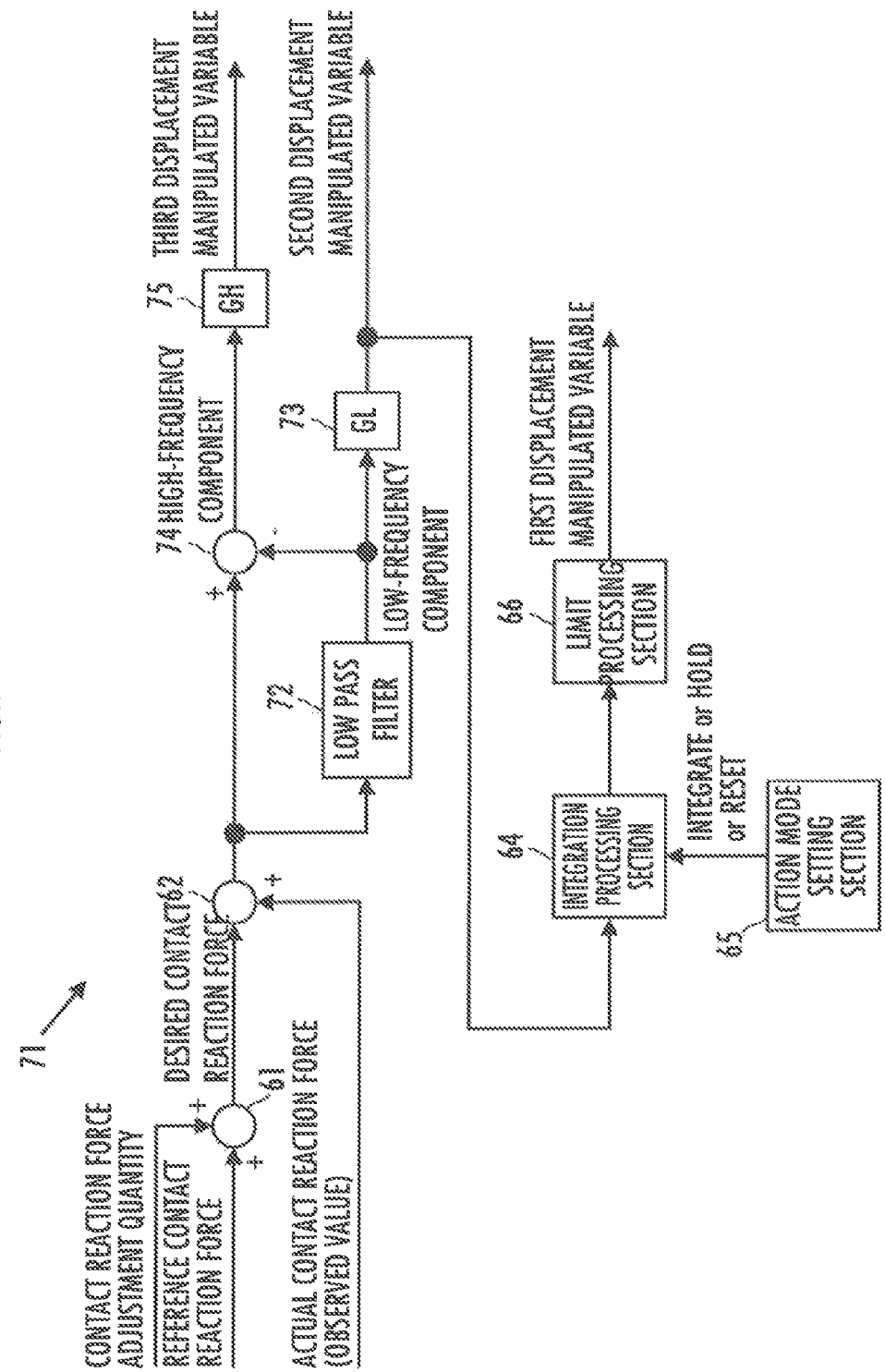
FIG. 9 is a block and line diagram showing the processing performed by the displacement manipulated variable determination section in a second embodiment.

Referring to FIG. 9, in the present embodiment, a displacement manipulated variable determination section 71 is configured to determine, for each contacting portion (13 or 23), a set of a first displacement manipulated variable, a second displacement manipulated variable, and a third displacement manipulated variable as a displacement manipulated variable for making a desired position/posture of the contacting portion (13 or 23) displaced, by the processing illustrated in FIG. 9.

In this case, the displacement manipulated variable determination section 71 calculates contact reaction force deviations (translational contact reaction force deviation and rotational contact reaction force deviation) by the processing in arithmetic sections 61 and 62, as in the first embodiment.

The displacement manipulated variable determination section 71 then inputs the calculated contact reaction force deviations (translational contact reaction force deviation and rotational contact reaction force deviation) to a low pass filter 72, to sequentially extract, for each of the translational contact reaction force deviation and the rotational contact reaction force deviation, a low-frequency component of the contact reaction force deviation. The displacement manipulated variable determination section 71 performs processing of reducing the low-frequency component from the contact reaction force deviation in an arithmetic section 74, to sequentially extract a high-frequency component of the contact reaction force deviation.

It should be noted that the high-frequency component may be extracted from the contact reaction force deviation by using a high pass filter. The low-frequency component may be extracted by performing processing of reducing the high-frequency component from the contact reaction force deviation.

The displacement manipulated variable determination section 71 then multiplies the low-frequency component of the contact reaction force deviation by a gain GL of a prescribed value in an arithmetic section 73, to obtain the resultant value as a second displacement manipulated variable. The displacement manipulated variable determination section 71 also multiplies the high-frequency component of the contact reaction force deviation by a gain GH of a prescribed value in an arithmetic section 75, to obtain the resultant value as a third displacement manipulated variable.

Accordingly, the second displacement manipulated variable is a feedback manipulated variable which is determined by a scaling law, as a feedback control law, in accordance with the low-frequency component of the contact reaction force deviation. Similarly, the third displacement manipulated variable is a feedback manipulated variable which is determined by a scaling law, as a feedback control law, in accordance with the high-frequency component of the contact reaction force deviation.

It should be noted that the second displacement manipulated variable and the third displacement manipulated variable are each made up of a translational displacement component according to the translational contact reaction force deviation and a rotational displacement component according to the rotational contact reaction force deviation.

Further, the displacement manipulated variable determination section 71 subjects the second displacement manipulated variable (the output value from the arithmetic section 73) to processing in an integration processing section 64 and a limit processing section 66, which perform the processing identical to those in the first embodiment, and determines the obtained value as a first displacement manipulated variable. In this case, the action mode of the integration processing section 64 is set by an action mode setting section 65 in the same manner as in the first embodiment.

In the present embodiment, for each contacting portion (13 or 23), the first to third displacement manipulated variables determined in the displacement manipulated variable determination section 71 in the above-described manner are supplied, together with the reference operational goal, to the joint actuator controlling section 54.

Then, in the present embodiment, the joint actuator controlling section 54 corrects the desired position/posture of each contacting portion (13 or 23) included in the reference operational goal. Specifically, the joint actuator controlling section 54 corrects the desired position by the displacement manipulated variable obtained by summing up the first to third displacement manipulated variables according to the translational contact reaction force deviation. Further, the joint actuator controlling section 54 corrects the desired posture by the displacement manipulated variable (combined manipulated variable) obtained by summing up the first to third displacement manipulated variables according to the rotational contact reaction force deviation.

Further, the joint actuator controlling section 54 controls the joint actuators 41, as in the first embodiment, in accordance with the corrected, desired position/posture of each contacting portion (13 or 23), as well as the desired position/posture of the body 2 and the desired posture of the head 5 indicated by the reference operational goal.

The present embodiment is identical to the first embodiment except for the matters described above.

In the present embodiment, as the displacement manipulated variable for making the desired position/posture of each contacting portion (13 or 23) displaced so as to cause the actual contact reaction force of the contacting portion (13 or 23) to approach the desired contact reaction force, the second displacement manipulated variable proportional to the low-frequency component of the contact reaction force deviation and the third displacement manipulated variable proportional to the high-frequency component of the contact reaction force deviation are used in addition to the first displacement manipulated variable which corresponds to the displacement manipulated variable in the first embodiment.

In this case, with the second displacement manipulated variable further included, each contacting portion (13 or 23) can be more quickly brought into contact with an external object in a closely fitting manner.

Moreover, with the third displacement manipulated variable further included, particularly in the case where a contacting portion (13 or 23) comes into contact with an external object in the no-contact required state, the position/posture of the contacting portion (13 or 23) can be adjusted more quickly so as to reduce the contact reaction force.

In each of the embodiments described above, the integration processing on the contact reaction force deviation was carried out in the integration processing section 64 for each contacting portion (13 or 23). The integration processing section 64, however, may execute for example the following processing. For example in each control processing cycle, the integration processing section 64 may calculate an average value (at the current time) of contact reaction force deviations of all the contacting portions (13, 23) for which the determination result in STEP 2 or STEP 4 described above becomes positive (i.e. any contacting portion (13 or 23) that is actually in contact with an external object or that is in the contact required state). Then, the integration processing section 64 may perform integration processing on a deviation (corresponding to the second deviation in the present invention) obtained by subtracting the average value from the current contact reaction force deviation of each contacting portion (13 or 23), or on a value obtained by multiplying the second deviation by a gain of a prescribed value. In this case as well, the effects similar to those in each of the above embodiments can be obtained.

In addition, with the configuration as described above, for example in the situation where the robot 1 is standing with a plurality of contacting portions (13, 23) in contact with the ground surface, it is possible to prevent an undesirable event that the displacement manipulated variable for any of the contacting portions (13, 23) becomes too much due to an influence of an offset component or an error in the observed value of the contact reaction force of any of the contacting portions (13, 23). It is thus possible to mutually balance the displacement manipulated variables of the respective contacting portions (13, 23).

The embodiments were described above by giving as an example a robot 1 having two leg links 3R, 3L and two arm links 4R, 4L as the movable links. The mobile robot in the present invention, however, may be a robot having three or more leg links as the movable links, or may be a robot having no arm link.

Further, the contacting portion of each movable link 3 or 4 of the robot 1 is not limited to the tip end of the movable link 3 or 4. For example, the contacting portion of each movable link 3 or 4 may be an intermediate portion of the movable link 3 or 4, which may be the knee of a leg link 3, the elbow of an arm link 4, etc.

What is claimed is:

1. A control device for a mobile robot having a plurality of movable links extended from a body, each movable link of the plurality of movable links having a predetermined site as a contacting portion and being configured to move with respect to the body by an action of one or more joints disposed between a distal end of the movable link and the body, the mobile robot moving with a motion including an operation in which at least one of the movable links of the plurality of movable links is moved in the air, not in contact with an external object, and a succeeding operation in which the contacting portion of the at least one of the movable links of the plurality of movable links is brought into contact with the external object, the control device comprising:

a contacting portion displacement manipulated variable determination section which, for the contacting portion of each of the plurality of movable links,
sequentially acquires an observed value of a contact reaction force actually acting on the contacting portion from the external object and sequentially acquires a desired value of the contact reaction force,
sequentially performs a determination process to determine whether or not at least one of a first condition and a second condition has been satisfied, the first condition being a condition that the contacting portion is actually in contact with the external object, and the second condition being a condition that that a desired motional state of the contacting portion indicated by an operational goal for the mobile robot is a state in which the contacting portion is to be brought into contact with the external object, and
performs, for each contacting portion for which a result of the determination process becomes positive, either one integration processing of integrating a first deviation or integrating a second deviation, to sequentially determine a first displacement manipulated variable for making a desired position and/or posture of the contacting portion displaced from a position and/or posture indicated by the operational goal for the mobile robot so as to cause the observed value of the contact reaction force acting on the contacting portion to approach the desired value, wherein the first deviation is a deviation between the observed value and the desired value of the contact reaction force acting on the contacting portion, and the second deviation is a deviation between a first deviation corresponding to each contacting portion and an average value of first deviations corresponding respectively to all contacting portions for which each of results of the determination process becomes positive; and an actuator controlling section which sequentially determines a desired displacement amount of each joint of the mobile robot, in accordance with at least the operational goal for the mobile robot and the first displacement manipulated variable determined, to control an actuator that drives a corresponding joint, in accordance with the desired displacement amount.

2. The control device for the mobile robot according to claim 1, wherein the contacting portion displacement manipulated variable determination section is configured, in determining the first displacement manipulated variable for each contacting portion for which the determination result becomes positive and for which the first condition is not satisfied and the second condition is satisfied, to maintain a component of the first displacement manipulated variable that makes the desired posture of the contacting portion displaced, at a constant value, without updating the same, and to sequentially determine a component of the first displacement manipulated variable that makes the desired position of the contacting portion displaced, by the integration processing.

3. The control device for the mobile robot according to claim 1, wherein the contacting portion displacement manipulated variable determination section is configured, in determining the first displacement manipulated variable for each contacting portion for which the determination result becomes positive and for which at least the first condition out of the first and second conditions is satisfied, to sequentially determine both of a component of the first displacement manipulated variable that makes the desired position of the contacting portion displaced and a component of the first displacement manipulated variable that makes the desired posture of the contacting portion displaced, by the integration processing.

4. The control device for the mobile robot according to claim 1, wherein the contacting portion displacement manipulated variable determination section is configured to determine the first displacement manipulated variable corresponding to each contacting portion that has changed from a situation where the determination result becomes positive to a situation where the determination result becomes negative, in such a manner that the first displacement manipulated variable is sequentially attenuated to zero from a value determined in the situation where the determination result becomes positive.

5. The control device for the mobile robot according to claim 1, wherein
   the contacting portion displacement manipulated variable determination section further has a function of sequentially determining, irrespective of the result of the determination process, a second displacement manipulated variable and a third displacement manipulated variable as displacement manipulated variables for making the desired position and/or posture of each contacting portion displaced from the position and/or posture indicated by the operational goal for the mobile robot so as to cause the observed value of the contact reaction force acting on each contacting portion to approach the desired value, and a function of sequentially extracting a low-frequency component and a high-frequency component on a higher frequency side than the low-frequency component out of the first deviation or the second deviation, and the contacting portion displacement manipulated variable determination section is configured, in determining the second and third displacement manipulated variables corresponding to each contacting portion, to sequentially determine a value proportional to the low-frequency component and a value proportional to the high-frequency component as the second displacement manipulated variable and the third displacement manipulated variable, respectively, and in determining the first displacement manipulated variable for each contacting portion for which the determination result becomes positive, to sequentially determine the first displacement manipulated variable by integration processing of integrating the low-frequency component, and
   the actuator controlling section is configured to sequentially determine the desired displacement amount of each joint of the mobile robot in accordance with the operational goal for the mobile robot and a combined manipulated variable of the first, the second, and the third displacement manipulated variables determined.

6. The control device for the mobile robot according to claim 1, further comprising:
   a contact reaction force adjustment quantity determination section which sequentially acquires a body posture deviation, which is a deviation between an observed value of actual posture of the body and a desired posture of the body indicated by the operational goal for the mobile robot, and sequentially determines, in accordance with the body posture deviation, a contact reaction force adjustment quantity to be added to each contacting portion so as to cause an external force making the body posture deviation approach zero to be added to the mobile robot; wherein
   the contacting portion displacement manipulated variable determination section is configured to use, as the desired value of the contact reaction force for each contacting portion, a value of the contact reaction force obtained by adding the contact reaction force adjustment quantity determined for the contacting portion to a reference contact reaction force, the reference contact reaction force being a contact reaction force that is supposed to dynamically act on each contacting portion assuming that an actual motion of the mobile robot is made in accordance with the operational goal.

7. The control device for the mobile robot according to claim 1, configured to have a function of stopping an operation of the mobile robot in a case where at least one of components constituting the first displacement manipulated variable for each of the contacting portions attains an absolute value not smaller than a predetermined threshold value, the components being a component that makes the desired position of the contacting portion displaced and a component that makes the desired posture of the contacting portion displaced.

* * * * *